SUBSCRIBER CALL TRANSMITTING SYSTEM

Filed Dec. 30, 1957 2 Sheets-Sheet 1

INVENTORS A. BUSALA
L. SCHENKER
F. WEST

BY John E. Wagner
ATTORNEY

SUBSCRIBER CALL TRANSMITTING SYSTEM

Filed Dec. 30, 1957 2 Sheets-Sheet 2

INVENTORS A. BUSALA
L. SCHENKER
F. WEST
BY John E. Wagner
ATTORNEY

United States Patent Office 2,927,971

Patented Mar. 8, 1960

2,927,971

SUBSCRIBER CALL TRANSMITTING SYSTEM

Alessandro Busala and Leo Schenker, Berkeley Heights, and Fred West, Mendham, N.J., assignors to Bell Telephone Laboratories, Incorporated, New York, N.Y., a corporation of New York Application December 30, 1957, Serial No. 706,187

10 Claims. (Cl. 179—90)

This invention relates to telephone substation apparatus and more particularly to call transmitters for such apparatus intended for use in conjunction with electronic switching telephone systems.

The advantages of extremely high speed operation, enormous information storage capacity with rapid access coupled with the elimination of the difficulties of maintenance of mechanical switching elements are all demonstrated by the electronic switching system disclosed in the patent application of Budlong et al. Serial No. 688,386 filed October 7, 1957. In order to utilize such systems to the fullest advantage, it is essential that the subscriber apparatus including in particular the call transmitter be compatible in terms of supplying digital information in a form which is readily usable by the switching system and, equally important, to supply the information at a rate comparable to the system's operating speed. The use of a conventional dial with its pulsing rate of ten to twelve pulses per second plus the interdigital time imposed by the windup operation definitely imposes a speed restriction upon such a switching system which is an order of magnitude slower than the normal line scanning rate of the switching system.

One proposal to overcome such a disparity in the calling signal generation and utilization speed is disclosed in the copending application of L. A. Meacham Serial No. 469,802 filed November 18, 1954. That invention involves signalling by means of decaying transients over the line with a particular frequency assigned to each digit. The time required for such a transmission is exceedingly small. The frequencies designated in that proposal all fall within the voice frequency range to insure satisfactory transmission. However, in voice frequency signalling systems noise or speech picked up by the transmitter at the calling station contains the frequencies used for signalling and may cause a false digit to be registered or mask a correct digit.

The prevention of such interference, termed talkoff protection, may be accomplished by employing such circuit arrangements as are disclosed in the copending application Serial No. 743,434 filed June 20, 1958 of L. A. Meacham et al. However, it is desirable if possible to employ direct current signalling provided the signalling time for each digit may be minimized. Therefore, it is an object of this invention to provide a subscriber calling system operable in such short time that the limitation in speed resides in the subscriber's ability to manipulate the calling device in a normal manner rather than in the equipment itself.

A further object of this invention is to provide such a signalling system which is insensitive to noise or speech picked up by the transmitter thereby eliminating a prime cause of false registration of digits.

Another object of this invention is to achieve such a signalling system employing a minimum of additional components in the subscriber set.

Still another object of this invention is to provide such a system which is insensitive to normal variations in the subscriber loop voltage and current and to normal variation in the characteristics of the components employed.

These objects are accomplished in accordance with this invention, one embodiment of which comprises a telephone substation set including a transmitter, a receiver and a hybrid coil for interconnecting the transmitter circuit and the receiver to the telephone line. A line impedance balancing network of conventional form is employed and a constant voltage device for establishing a reference level of the direct current within the subscriber set is connected across the direct current path of the set. A semiconducting switch or transistor is connected in the direct current path through the telephone substation circuit including one electrode which is normally connected to the threshold device. A manual control, for example, a series of push buttons is arranged to switch momentarily the above-mentioned electrode of the semiconductor switch from the constant voltage device to a point in the circuit of lower potential whereupon the conduction of the transistor is temporarily altered and the direct current path through the circuit is effectively interrupted. The length of time of the interruption of direct current flow is a function of time constant of a resistor-capacitor network connected between the constant voltage device and the transistor's base circuit. With a different resistor for each push button a different period of line direct current interruption is achieved for each push button.

A locking mechanism for the push buttons actuatable by the interruption of line loop current prevents the simultaneous depression of two buttons or the depression of a second button during the period of transmitting signalling information, i.e., loop current interruption.

One feature of this invention relates to the application of a semiconductive switching element to the direct current loop of a telephone substation circuit and the control or interruption of the loop current by changing the conduction characteristics of the semiconductive element.

Another feature of this invention involves the use of a threshold device for establishing the normal operating condition of the semiconductive device and the magnitude of the direct current flowing through the substation set.

Still another feature of this invention is based upon the use of an impedance network of discrete time-voltage relationship associated with the semiconductive element and controlling the duration of loop current interruption.

One feature of this invention is the arrangement for locking the operated and the unoperated controls during the signalling period, the lockout mechanism being responsive to the signalling condition.

These and other features of this invention may be more clearly understood from the detailed description and by reference to the accompanying drawing in which:

Fig. 1 is an electrical schematic representation of a transistorized transmission equalized substation circuit including calling elements of this invention;

Fig. 1*a* is a fragmentary drawing of another embodiment of the calling elements of Fig. 1;

Figures 1, 1A, 2:
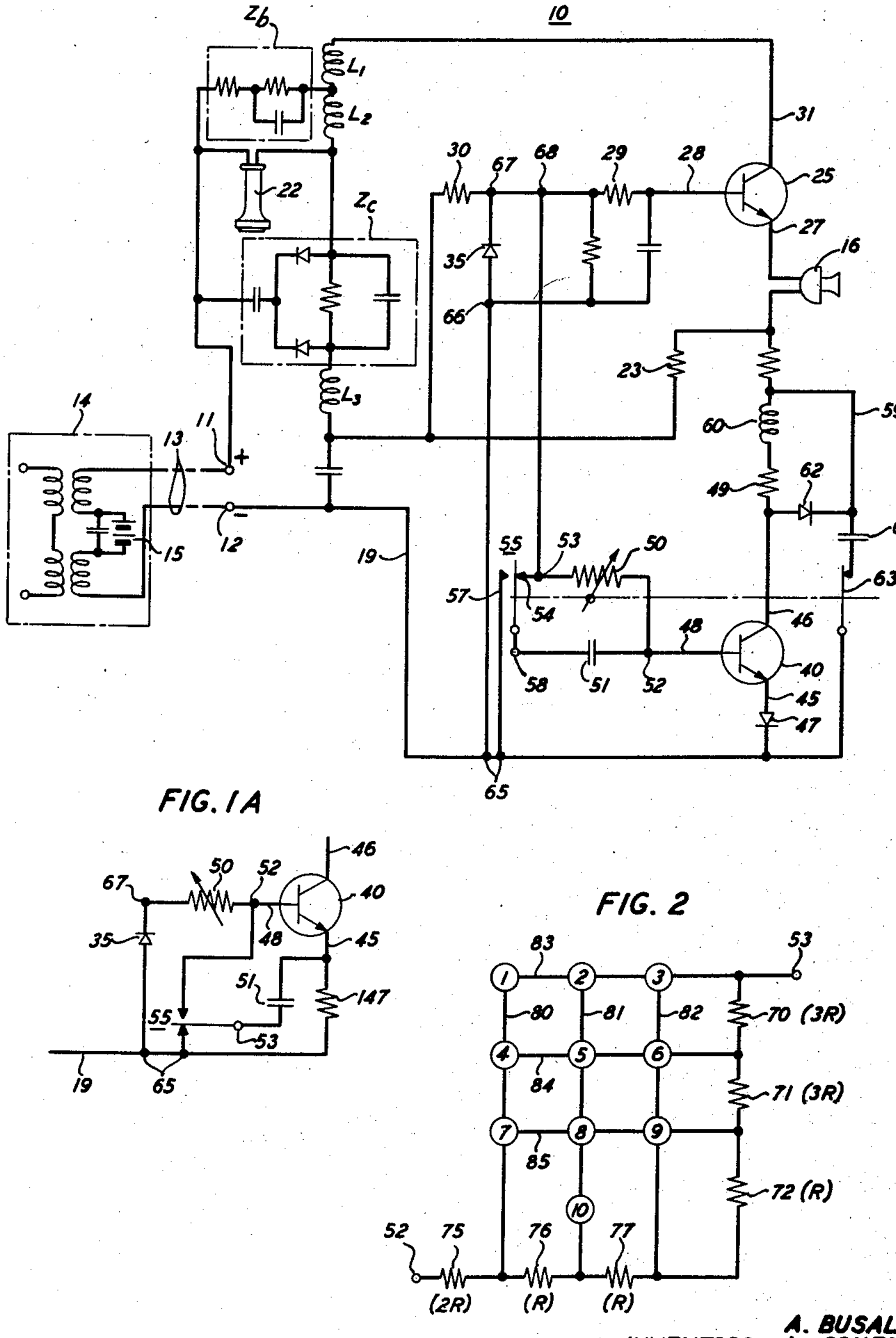
Fig. 2 is a schematic representation of the crosspoint switch resistance network constituting a part of the circuit of Fig. 1.

Referring now to Fig. 1, the speech and calling or dialing circuits of a telephone substation set 10 may be seen therein. The substation set 10 includes terminals 11 and 12 arranged to be connected over a telephone line 13 to a telephone central office 14 including a direct current supply 15. The speech circuit of substation set 10 includes a transmitter 16 ordinarily of the carbon microphone type, a receiver 22, an induction coil L including windings L1, L2, and L3, and a line balancing network $Z_b$. The receiver 22 is shunted by a line loop equalizing network $Z_c$ which provides a low impedance shunt for signals on short loop connections where the received signal would be otherwise uncomfortably high.

The transmitter 16 similarly is afforded telephone line length equalization via a resistor 23 and additionally is provided with amplification by a transistor 25 connected in common base configuration with an emitter electrode 27 coupled to the transmitter 16, a base electrode 28 coupled through resistors 29 and 30 to one side of the induction coil L and a collector-electrode 31 connected to the other side of the induction coil L. The voltage levels in the station set including the electrode potentials of the transistor 25 are established by a diode 35 connected between a negative loop conductor 19 and the base circuit of transistor 25. The diode 35 has the property of current conduction at a constant voltage level (e.g., ten volts) with any level of input current. This device, commonly termed a Zener diode, is of the type described in the article by F. H. Chase et al. entitled "Transistors and Junction Diodes in Telephone Power Plants," appearing in the Bell System Technical Journal, July 1954 at page 827. The diode 35 by its conduction characteristic establishes voltage levels throughout the telephone set which by proper choice of resistance elements result in a normal current of 7.5 milliamperes through the transmitter 16 whenever the telephone set is connected to the telephone line. A more complete description of the speech circuit of this telephone set and its equalization features appears in the patent application Serial No. 574,712 of A. Busala and L. A. Meacham filed March 29, 1956, now Patent 2,818,470 and the Patent 2,801,288 of L. A. Meacham issued July 30, 1957.

In addition to the above-described speech elements of the substation circuit 10, a second transistor 40 is provided having an emitter electrode 45 and a collector electrode 46 connected in the direct current path through the substation set 10. The emitter electrode 45 is connected to the negative line conductor 19 through a diode 47 which assists the transistor 40 in blocking reverse current from the emitter to the base electrode when reverse bias is applied to the emitter during the signalling operation.

The base electrode 48 of transistor 40 is connected through a variable resistance element 50, junctions 53, 68 and 67 to one side of diode 35. The resistance element 50 is chosen with a maximum setting which will insure saturation current of the transistor 40 when the set is connected to the telephone line and no calling control is operated. A capacitor 51 is connected in parallel with the resistance 50 through terminals 52 and 53 and the back contact 54 of a switch 55. The front contact 57 of the switch 55 is connected to the negative loop conductor 19 to provide a "grounding" or discharging path for capacitor 51.

Figure 3:
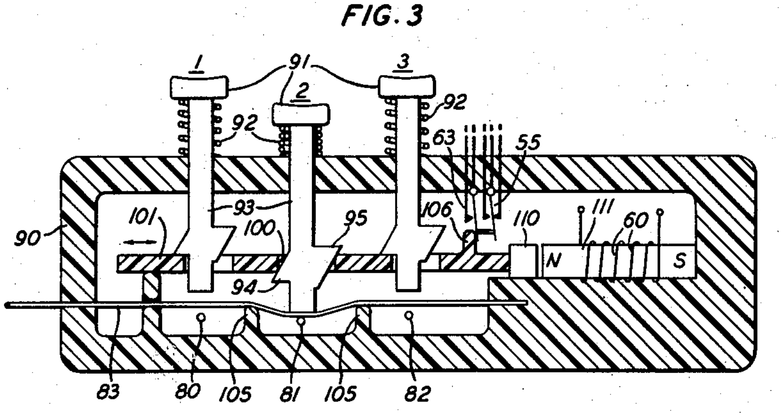
Fig. 3 is an elevational view in section of a simplified form of crosspoint switch and magnetic locking mechanism.
Figure 5:
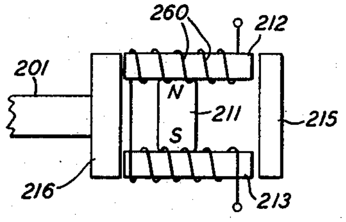
Fig. 5 is an elevational view of a modification of the magnetic locking mechanism of Fig. 3.

The collector circuit of the transistor 40 also includes an inductive element, coil 60 which is the winding of an electromagnetic lock mechanism best seen in Figs. 3 and 5. A bypass for speech currents around the coil 60 and the transistor 40 exists through conductor 59, capacitor 61 and a normally closed switch 63.

As shown in Fig. 1 the capacitor 51 is placed in series with the base-emitter circuit, actually connected between the base electrode 48 and terminal 67 of the diode 35. Upon operation of the transfer switch 55 the capacitor terminal 58 is switched to a lower voltage. It is the relative levels of the base and emitter electrodes of transistor 40 which determine whether the transistor 40 is in either a conducting or non-conducting state. Therefore the same result may be obtained by connecting the capacitor in the emitter circuit and switching it to a higher voltage. Such an arrangement is shown in Fig. 1*a* in which the calling elements common to Fig. 1 are identified with the same designations. In this embodiment, capacitor 51 is normally connected between the emitter electrode 45 and the negative loop conductor 19 through the back contact of transfer switch 55. The capacitor is also across a newly added resistor 147 replacing diode 47 of Fig. 1. The capacitor 51 will normally be charged to the voltage across resistor 147 in the loop current path. Upon operation of the transfer switch 55 the terminal 53 is transferred to the higher potential base circuit to cut off the conduction of transistor 40. The discharge path of capacitor 51 in Fig. 1*a* is through resistor 147, diode 35, variable resistor 50 and terminals 52 and 53. The time constant of discharge is a function of the value of capacitor 51 and the total value of resistors 147 and 50.

The adjustable resistance 50 of Figs. 1 and 1*a* in a preferred embodiment is in fact a resistance matrix as shown in Fig. 2 including series connected individual resistors 70, 71, 72, 75, 76, and 77 with one side of resistor 70 connected to terminal 53 and one side of resistor 75 connected to terminal 52. At the junctions between terminal 53 and resistor 70, resistors 70 and 71, and resistors 72 and 71 are conductors 83, 84, and 85 respectively shown in the drawing in horizontal array. At the junctions between resistors 75 and 76, resistors 76 and 77, and resistors 77 and 72 are conductors 80, 81, and 82 respectively shown in the drawing in vertical array. At each intersection point between the conductors, designated by a numbered circle, is a switching element arranged to make contact between the two conductors upon actuation. Advantageously the switching elements are push buttons. This resistance network 50 affords the connection of a predetermined resistance value into the base circuit of transistor 40 of Fig. 1 between the terminals 52 and 53 upon the operation of each of the ten switching elements. Resistors 70 and 71 may be of equal value designated as 3R; resistor 75 may have a value designated as 2R; and resistors 72, 76, and 77 may have a value designated as R. In one preferred form of the embodiment the value R was 5400 ohms. With such an arrangement the value of resistance introduced into the circuit between terminals 52 and 53 upon operation of each of the push buttons appears in the following tabulation:

| Push Button | Resistance 50 in ohms |
|---|---|
| 1 | 10800 (2R) |
| 2 | 16200 (3R) |
| 3 | 21600 (4R) |
| 4 | 27000 (5R) |
| 5 | 32400 (6R) |
| 6 | 37800 (7R) |
| 7 | 43200 (8R) |
| 8 | 48600 (9R) |
| 9 | 54000 (10R) |
| 0 | 59400 (11R) |
| None operated | 59400 (11R) |

In the embodiment shown in Fig. 2 the key designated 10 is not positioned at a cross point and its operation does not produce a change in resistance but allows the full series value made up of resistance elements 70, 71, 72, 75, 76, and 77 across terminals 52 and 53. The significance of the operation of the No. 10 key is that it operates the switches 55 and 63 which make the resistance elements effective producing a change in current conditions.

A simplified physical embodiment of the cross point switch of Fig. 2 may be seen in Fig. 3 where it includes a housing or frame 90 mounting a series of 10 keys 91, three of which, designated as keys 1, 2, and 3, appear including the helical return spring 92 thereunder. The keys 91, of which key 2 is typical, each include an elongated plunger 93, mount wedge-shaped elements 94 and 95 on opposite sides which are designed to pass through an opening 100 in a slide 101 positioned for lateral movement within the housing 90. Beneath the slide 101 adjacent the end of the plunger 93 are the cross point conductors 81 and 83 extending through channels formed by integral ribs 105 in the housing 90. Fixed to the slide 101 is an arm 106 extending into contact with a pile up of switch elements including the normally closed switch 63 and the transfer switch 55. The slide 101 and arm 106 are arranged to open switch 63 and transfer switch 55 upon actuation of any of the keys. Affixed to the end of the slide is an armature 110 spaced from a permanent magnet 111 secured to the frame 90. Encircling the permanent magnet is the coil 60 of Fig. 1 through which subscriber loop direct current flows. The direction of the loop current is such as to produce a magnetomotive force in opposition to that of the permanent magnet 111. Operation of any key 91 results in the interruption of loop current which, as hereinafter described, allows the permanent magnet 111 to hold the slide 101 in its operated position by attraction of the armature 110 during the period of loop current interruption. During such time the wedge portion 94 of the plunger 93 of the operated key is restrained by the slide 101 and the key 91 remains depressed until the loop current again commences to flow. Unoperated keys, e.g., keys 1 and 3 et cetera, are similarly restrained from motion due to the displacement of slide 101.

The locking arrangement of the keys 91 by magnet 111 and the opposed magnetomotive force produced by the coil 60 is shown in its simplest form in Fig. 3. In order to insure that the opposing magnetomotive force is sufficient to neutralize the effect of the magnet 111, the improved and preferred embodiment shown in Fig. 5 is proposed. There magnet 211 includes elongated pole pieces 212 and 213 with turns of coil 260 wound in series aiding relationship about the pole pieces 212 and 213. A magnetic shunt 215 is positioned across one end of the pole pieces 212 and 213 and spaced therefrom by a small air gap. The armature 216 mounted on slide 201 is designed to complete the magnetic circuit through the pole pieces as would be the case during loop current interruption.

During the periods of normal loop current flow when the armature 216 is spaced from the pole pieces 212 and 213 the magnetic flux from the coil 260 passes through the magnetic shunt 215 and the armature 216 rather than through the low permeability magnet 211. During loop current interruption almost all of the flux of the permanent magnet 211 passes through the armature 216 branch of the magnetic circuit since the reluctance is much less than that of the air gap including shunt branch 215.

The signalling system proposed here, as shown in Fig. 1, involves the generation of digit information by the duration of direct current interruption. Pulses are produced by interrupting the loop current of nominal value of 7.5 milliamperes for intervals varying from thirty milliseconds to 165 milliseconds depending upon which key is operated. A preferred interval of duration for the different digits is fifteen milliseconds in order to provide compatability with signal sensing means at the telephone central office designed to scan at a repetition rate of five milliseconds.

Figure 4:
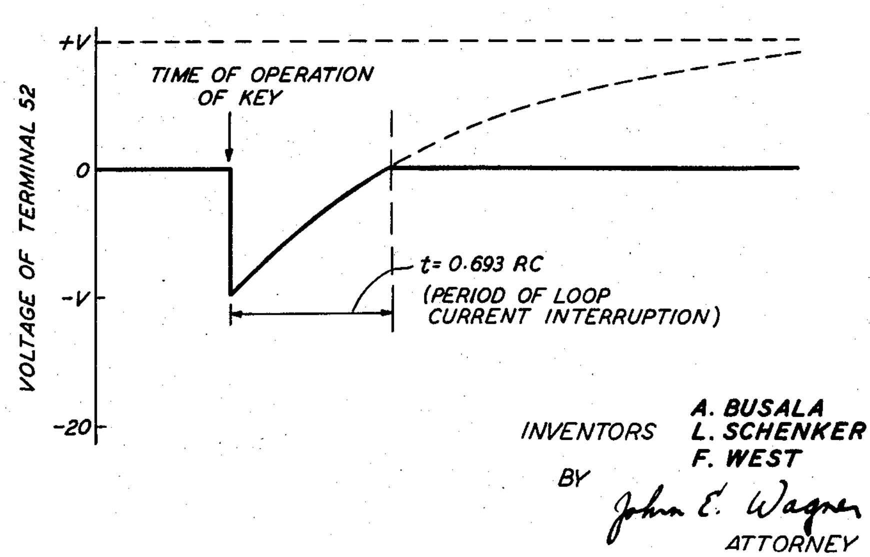
Fig. 4 is a graphical representation of the voltage time relationship of the calling mechanism of this invention during signalling.

Loop current interruption under the control of the subscriber is achieved by cutting off the conduction of the transistor 40. The duration of the period of cutoff is governed by values of the variable resistance 50 and the capacitor 51 in the base circuit. With the transfer switch 55 in the normal position as shown in Fig. 1, the capacitor terminal 58 is at the same potential as the positive electrode of the Zener diode, e.g., plus ten volts when considering for purposes of discussion the loop conductor 19 to be at ground potential. The terminal 52 of the capacitor is almost at ground potential because sufficient base current is supplied to the transistor 40 to maintain it in its conducting condition. As the transfer switch is operated upon depression of any key, the potential of the terminal 58 of the capacitor 51 is instantaneously dropped from the Zener voltage to ground with the result that the potential of the terminal 52 of the capacitor 51 drops to approximately a minus Zener voltage cutting off the transistor 40. Thereafter the capacitor 51 commences discharging with the current flowing from the capacitor 51 through junction 58, front contact 57 of switch 55, junctions 65 and 66 through the Zener diode 35, through junctions 67, 68, and 53 to the resistance 50 to the terminal 52 of the capacitor 51. In this way the potential of the terminal 52 of the capacitor rises exponentially from the minus Zener voltage and could finally reach the positive Zener voltage if the transistor did not resume conduction when the zero or ground voltage level was reached and the stable condition existed. The length of time that the transistor 40 is cut off is that required for a capacitor to arrive at zero volts in passing from a voltage of −V to a position of +V as shown in Fig. 4. The pulse or interruption in loop current is terminated by a reasonably definite event as opposed, for example, to an indefinite time at which the voltage reaches a value approached asymptotically. The duration of the interval is governed only by the values of capacitance and resistance and not affected by the magnitude of the Zener voltage of diode 35, inductance of the coil 60 nor possible speech currents at the transmitter. The pulse duration is, in effect, the time needed for a capacitor to lose half its initial potential and discharge through a resistance R as illustrated in Fig. 4. This may be expressed as $$e^{\frac{-t}{RC}}=\frac{1}{2}$$

or $t=0.693$ RC. Where the capacitance of capacitor 51 is four microfarads and the digit 1 key is operated and resistance 50=2R or 10,800 ohms, the time of interruption equals thirty milliseconds. Operation of the digit 2 key associated with a resistance value of 3R or 16,200 ohms produces an interruption of forty-five milliseconds. The remaining keys produce proportionately longer interruptions to 165 milliseconds for the digit 10.

During the period of loop current interruption the slide 101 is locked in the operated position (as shown in Fig. 3) and with the resumption of current flow the effect of the magnet is neutralized and the slide is released. For all of the digits, the interruption time is extremely short and the locking effect is ordinarily imperceptible to the user. It does prevent operation of a second key during signalling by a previous key which would result in a lost or distorted digit signal.

The induced voltage in coil 60 which would tend to maintain the loop current upon the interruption of conduction of transistor 40 is dissipated through resistor 49, diode 62 and conductor 59. Also the charging current that would flow from the telephone line 13 into capacitor 61 upon interruption of conduction of transistor 40 is avoided by opening switch 63 which is mechanically coupled to the transfer switch 55 and operates ahead of transfer switch 55 upon each operation of a push button.

The system for signalling of this invention provides the advantages of simplicity in that only the resistance matrix 50, transistor 40 and capacitor 51 need be added to the speech circuit and the push button assembly to the mechanical design to provide the subscriber calling function.

Reliability is achieved in that the signalling system is insensitive to variations in the level of the central office direct current at the subscriber station. This is achieved by first, the voltage equalization effect of the diode 35 at the subscriber station; second, the fact that the discharge time of the capacitor 51 through the resistance 50 is independent of the charging voltage; third, the signal generated, to wit, a finite period of loop current interruption cannot be duplicated by either speech or noise detected and sent out by the transmitter, thus preventing the existence of "talk-off" signalling errors; and, fourth, positive interlocking of the push buttons and the locking of the operated and unoperated push buttons controlled by the signalling condition.

It is to be understood that the above-described arrangements are illustrative of the application of the principles of the invention. Numerous other arrangements may be devised by those skilled in the art without departing from the spirit and scope of the invention.

What is claimed is:

1. In a telephone system including a pair of line conductors and a source of direct current connected to said line conductors, a telephone called transmitter comprising a transistor having a base electrode and having emitter and collector electrodes connected in a direct current path through said line conductors, an impedance network connected in said base-emitter circuit, said impedance network having a resistive element sufficient in value to establish the base-emitter voltage at a level resulting in conduction by said transistor, said impedance network including a capacitor having one electrode connected to said base-emitter circuit and another electrode connected to a point of different potential, switching means for momentarily transferring said last-mentioned terminal of said capacitor to a point of different potential sufficient to change the base-emitter voltage sufficiently to interrupt the conduction of said transistor, and circuit means including the resistive element of said impedance network for effecting the discharge of said capacitor, the time of discharge of said capacitor and resultant interruption of conduction of current through said transistor being determined by the time constant of said capacitor and resistive element.

2. The combination in accordance with claim 1 wherein said capacitor includes one terminal connected in the base circuit of said transistor.

3. The combination in accordance with claim 1 wherein said capacitors include one terminal connected in the emitter circuit of said transistor.

4. The combination in accordance with claim 1 wherein said resistance element includes discrete portions and said switching means includes a multiplicity of switching elements each associated with an individual digit and each operatve to connect a discrete portion of said resistance elements into the discharge path of said capacitor.

5. In a telephone system including a pair of line conductors, and a source of direct current connected to said conductors, a telephone substation call transmitter comprising a transistor having a base electrode and having emitter and collector electrodes connected in direct current path through said line conductors, an impedance network connected between one of said line conductors and said base electrode, said impedance network having a resistance characteristic sufficient to establish the base electrode voltage at a level resulting in conduction by said transistor, said impedance network including a capacitor connected in parallel with the resistance elements between said line conductor and said base electrode and switching means for transferring one terminal of said capacitor from one of said line conductors to the other side thereof to change the voltage level of said base electrode and thereby interrupt conduction of said transistor and circuit means including said resistance network for effecting the discharge of said capacitor, the time of discharge of said capacitor and resultant interruption of conduction of current through said transistor being determined by the time constant of said capacitor and said resistance network.

6. In a telephone system including a pair of line conductors and a source of direct current connected to said conductors, subscriber station call transmitting means comprising a constant voltage device for establishing a predetermined voltage at said subscriber station, a transistor having a base electrode and having emitter and collector electrodes connected in a direct current path through said line conductors, a controllable value resistance network connected between one side of said constant voltage device and the base electrode of said transistor, said resistance network having a normal value sufficient to establish the base electrode voltage with respect to the emitter electrode resulting in conduction by said transistor, a capacitor connected in parallel with said resistance network between said constant voltage device and said base electrode, means for manually changing the resistance of said resistance network to a discrete value and substantially simultaneously switching the one terminal of said capacitor from one side of said constant voltage device to the other side thereof to change the voltage level of said base electrode and thereby interrupt conduction of said transistor, and circuit means including said resistance network for effecting the discharge of said capacitor, the time of discharge of said capacitor and resultant interruption of conduction of current through said transsistor being determined by the time constant of said capacitor and the discrete value of said resistance network.

7. In a telephone system including a pair of line conductors and a source of direct current connected to said conductors, subscriber station call transmitting means comprising a constant voltage device connected to be powered by current through said line conductors for establishing a predetermined voltage at said subscriber station, a transistor having a base electrode and having emitter and collector electrodes connected in the direct current path through said line conductors, a resistance matrix including series connected resistance elements connected between said constant voltage device and said base electrode to establish the base electrode voltage at a level resulting in conduction of said transistor, push button means for bypassing certain of said series resistive elements to change the terminal resistance value of said network in discrete steps associated each with a respective push button, a capacitor connected in parallel with said resistance network between said constant voltage device and said base electrode, said push buttons mechanically coupled to switch one terminal of said capacitor from one side of said constant voltage device to the other side thereof substantially simultaneously with the establishment of the discrete value of said resistance network associated with the push button whereby the voltage level of said base electrode is changed interrupting the conduction of said transistor, and circuit means including said resistance network for effecting the discharge of said capacitor, the time of discharge of said capacitor and resultant interruption of conduction of current through said transistor being determined by the time constant of said capacitor and the discrete value of said resistance network.

8. The combination in accordance with claim 7 wherein said subscriber station call transmitting means includes means responsive to the operation of any of said push buttons for locking an operated push button in the operated condition and the remaining push buttons in unoperated conditions during the interruption of conduction of said transistor.

9. The combination in accordance with claim 8 wherein said locking means is responsive to the interruption of direct current through said line conductor circuit.

10. The combination in accordance with claim 9 wherein said locking means includes a slide mechanism mounted for displacement by operation of any of said push buttons, said push buttons including detent means for locking said push buttons when said slide is in the displaced position, an armature secured to said slide, magnetic means for holding said armature, and inductive means coupled in said direct current path of the line conductors for neutralizing the holding effect of said magnetic means during periods of direct current conduction.

References Cited in the file of this patent

UNITED STATES PATENTS

| | | |
|---|---|---|
| 2,228,113 | Hersey | Jan. 7, 1941 |
| 2,405,211 | Hartley | Aug. 6, 1946 |
| 2,438,496 | Deakin | Mar. 30, 1948 |